United States Patent [19]

Peter

[11] Patent Number: 5,730,074
[45] Date of Patent: Mar. 24, 1998

[54] LIQUID DISPENSER FOR SEED PLANTER

[75] Inventor: Jeffrey Peter, Hicksville, Ohio

[73] Assignee: Farmer Fabrications, Inc., Hicksville, Ohio

[21] Appl. No.: 661,401

[22] Filed: Jun. 7, 1996

[51] Int. Cl.[6] ............................................. A01C 5/06
[52] U.S. Cl. .......................... 111/118; 111/187; 111/189; 111/197
[58] Field of Search ........................ 111/73, 34, 187, 111/186, 170, 80, 197, 118, 127, 189; 239/159

[56] References Cited

U.S. PATENT DOCUMENTS

| | | | |
|---|---|---|---|
| 2,159,652 | 5/1939 | Brunner | 111/73 |
| 3,512,489 | 5/1970 | Coldren et al. | 111/34 |
| 4,580,506 | 4/1986 | Fleischer et al. | |
| 4,580,507 | 4/1986 | Dreyer et al. | 111/73 |
| 4,592,294 | 6/1986 | Dietrich, Sr. et al. | 111/73 X |
| 4,759,301 | 7/1988 | Thomas | 111/197 X |
| 4,762,075 | 8/1988 | Halford | 111/73 |
| 4,932,340 | 6/1990 | Benzel | 111/187 |
| 5,092,255 | 3/1992 | Long et al. | 111/197 X |
| 5,136,954 | 8/1992 | Fetaz et al. | 111/73 X |
| 5,331,907 | 7/1994 | Beaujot | 111/186 X |
| 5,396,851 | 3/1995 | Beaujot | 111/187 |
| 5,425,318 | 6/1995 | Keeton | 111/197 |

*Primary Examiner*—Terry Lee Melius
*Assistant Examiner*—Christopher J. Novosad
*Attorney, Agent, or Firm*—Baker & Daniels

[57] ABSTRACT

The present invention is a planter which embeds planted seeds into the ground and then dispenses liquid in the vicinity of the embedded seeds. The planter includes a flexible arm which drags upon the ground and presses the deposited seeds into the ground and a rigid tube which is attached to the flexible arm. A flexible hose extends from a liquid supply tank and is telescopingly received within the rigid conduit for communicating the liquid from the supply tank to the embedded seed. The resulting planted seeds are thereby embedded and substantially free of surrounding air pockets, and provided with liquid after being embedded to provide proper germination and growth.

18 Claims, 1 Drawing Sheet

5,730,074

LIQUID DISPENSER FOR SEED PLANTER

BACKGROUND OF THE INVENTION

1. Field of the Invention

The present invention generally relates to seed planters, and more particularly relates to seed planters having mechanisms for dispensing liquid to the planted seeds.

2. Description of the Related Art

A seed planter is a common agricultural tool which is used to quickly and effectively dispense seeds in a field for germination and growth. A seed planter is typically drawn by a vehicle such as a tractor, and provided with means for creating a furrow in the field, depositing the seeds, and backfilling the furrow such that the seeds are underground. In order to promote proper germination and growth of the seeds, it is desirable for the seeds to be packed into the ground, without surrounding air pockets, and for the seeds to be provided with appropriate amounts of nutrients and other substances. Such substances typically include fertilizer, water, and insecticide in liquid form.

Prior art devices have attempted various ways to remove air pockets from around the seeds, and to provide proper amounts of such liquid substances. For example, one known device is a planter which first digs a furrow, then deposits fertilizer, then partially backfills the furrow, then plants the seed, and then supplies additional fertilizer directly on the seed before backfilling the remaining portion of the furrow. However, such a device does not embed the seed before supplying fertilizer. Moreover, the shoe which partially backfills the furrow before depositing the seed may push the fertilizer rather than bury the fertilizer underground and therefore not provide the seeds with adequate fertilization.

Another similar device includes a resilient seed firming attachment for a planting machine, which drags on the ground after the seed is planted to press the seed into the soil to remove substantially all air pockets from around the seed, and thereby promote proper germination. However, such a device does not provide fertilizer or other liquid to the embedded seeds.

An alternative known method uses a fertilizer tube attached to a fertilizer knife which digs a trench and deposits fertilizer before the seeds are planted. In addition to depositing the fertilizer before the seeds, this type of device does not embed the seeds.

SUMMARY OF THE INVENTION

The present invention is a seed planter which includes both a mechanism for embedding the seed into the soil, and for then providing liquid substances directly to the embedded seed. The present invention therefore serves the dual functions of removing air pockets from the planted seed and thereby promoting proper germination, and also supplying appropriate amounts of liquid substances such as fertilizer, water, and insecticide to the embedded seed for proper and enhanced growth.

The present invention is a seed planter which includes a supply of seeds, and a mechanism for depositing the seeds into the soil. The seed embedding mechanism is attached to the planter and arranged to follow the planted seeds and press the seeds into the soil. A liquid dispenser is then attached to the seed planter to communicate liquid from a liquid supply to the vicinity of the embedded seeds.

One advantage of the present invention is that liquid is supplied to the seeds after the seeds are embedded. The liquid is therefore not pulled or pushed away from the embedded seed by the embedding device, and is therefore able to be utilized by the embedded seed.

Another advantage of the present invention is that the seed is first embedded into the soil so that air pockets do not exist in the area surrounding the planted seed.

The present invention provides, in one form thereof, a seed planter comprising a chute for depositing seeds into the ground, a firmer for embedding the seeds into the ground, and a liquid dispenser to communicate liquid to the embedded seeds. The chute for depositing seeds into the ground is in communication with a supply of seeds, and the firmer for embedding the seeds is attached to the planter and arranged to follow the planted seeds and press the planted seeds into the ground. The liquid dispenser is also attached to the planter and is in communication with a supply of liquid for communicating the liquid from the supply to the vicinity of the embedded seeds.

The present invention, in another form thereof, provides a seed embedding and liquid dispensing device for attachment to a seed planter comprising an elastically deformable arm, and a conduit attached to the deformable arm arranged to deposit liquid in the vicinity of the embedded seed. The elastically deformable arm is arranged to drag on the ground after a seed is planted and press the planted seed into the ground. The conduit includes an inlet and an outlet wherein the inlet is in fluid communication with the supply of liquid and the outlet is arranged to deposit liquid in the vicinity of the embedded seed.

The present invention, in another form thereof, provides a liquid dispensing device for use in connection with a seed firmer wherein the seed firmer is an elastically deformable arm attached to a seed planter. The seed firmer drags on the ground and embeds the seeds after the seeds are deposited into the ground. The liquid dispensing device comprises a conduit attached to the seed firmer and has an inlet and an outlet wherein the inlet is in fluid communication with a supply of liquid and the outlet is arranged to dispense the liquid in the vicinity of the embedded seeds.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
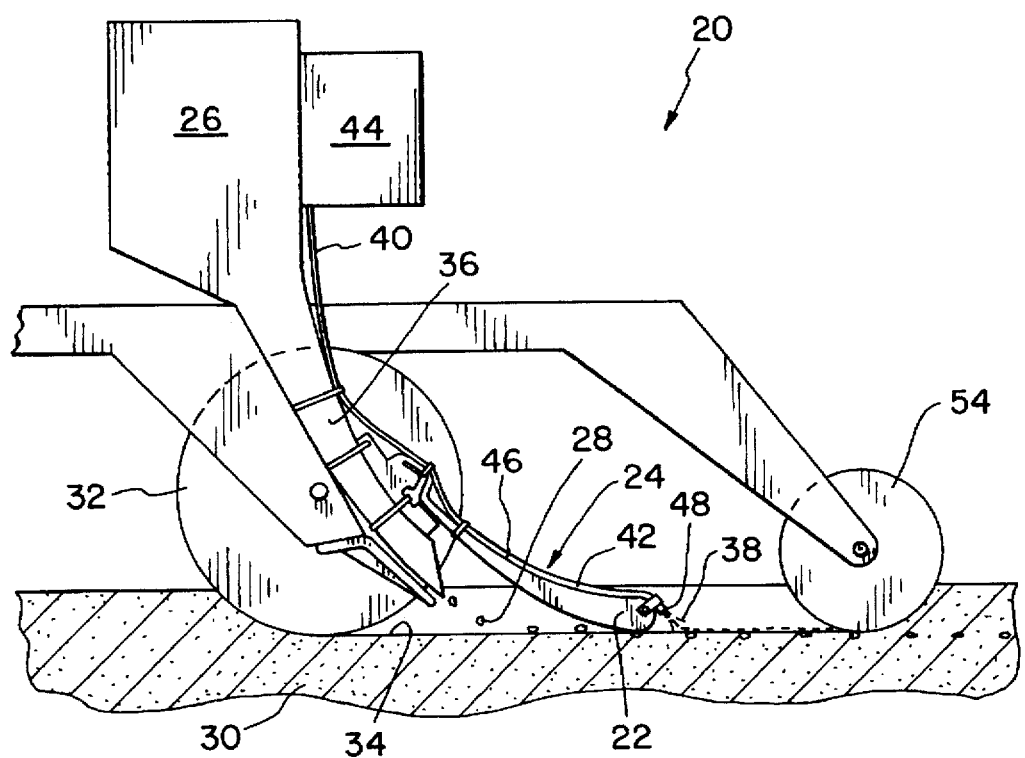
FIG. 1 is a side diagrammatical view of the present invention.

Referring now to the drawings and particularly to FIG. 1, there is shown planter 20 having firmer 22 and liquid dispenser 24 attached thereto. Although not depicted in FIG. 1, planter 20 is adapted to be connected to a primary mover such as a tractor to traverse the soil of a field for planting.

Planter 20 also includes a seed supply hopper 26 from which seeds 28 are drawn for implantation into soil 30.

Planter 20 also includes cutting discs 32 arranged in a "V" formation which precede planter 20 to create furrow 34. Seeds 28 proceed from hopper 26, through chute 36 and are individually deposited into furrow 34 as shown in FIG. 1.

After seeds 28 are deposited in furrow 34, firmer 22, which is positioned and biased to drag along soil 30, presses seeds 28 into soil 30 such that substantially no air pockets exist around seed 28. This promotes proper germination and growth of seed 28. Firmer 22 is a resilient deformable arm attached to planter 20 and positioned to follow planted seeds 28 and force seeds 28 into soil 30. In the exemplary embodiment, firmer 22 is manufactured from plastic, but other materials having similar elasticity characteristics are possible. The degree of vertical bias of firmer 22 can be adjusted by screw 29.

Figure 2:
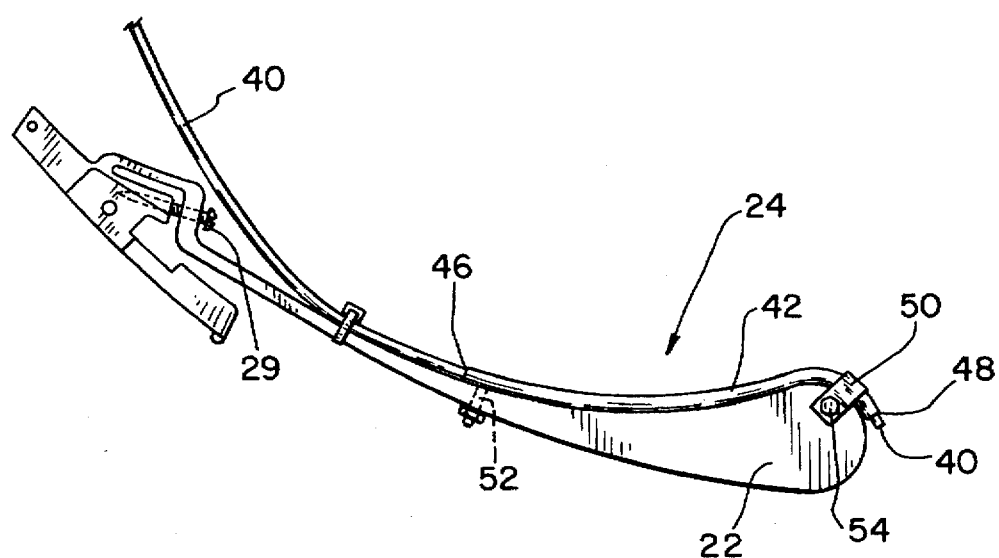
FIG. 2 is an enlarged fragmentary view of the liquid dispensing device shown in FIG. 1.

After firmer 22 has pressed seeds 28 into soil 30, liquid 38 is dispensed onto embedded seeds 28 as also shown in FIG. 1. In the exemplary embodiment, liquid 38 is communicated to seeds 28 through flexible hose 40 and rigid conduit 42 as best shown in FIG. 2. Also in the exemplary embodiment, rigid conduit 42 is manufactured from stainless steel although other materials which are sufficiently corrosion-resistant and durable could be used. As shown in FIG. 2, rigid conduit 42 is sized to telescopingly receive flexible hose 40, which in turn is connected to liquid supply tank 44 as best shown in FIG. 1. Liquid supply tank 44 is adapted to contain any suitable liquid such as fertilizer, water, or insecticide.

Rigid conduit 42 is provided with inlet 46 and outlet 48 wherein outlet 48 is positioned at the end of firmer 22 such that liquid 38 is dispensed in the vicinity of embedded seeds 28. Rigid conduit 42 is secured to firmer 22, in the exemplary embodiment, by bracket 50 and stud 52. Bracket 50 is a U-shaped metal coupling, which is fastened about rigid conduit 42 and secured to firmer 22 with bolt 54. The inlet end of rigid conduit 42 is attached to firmer 22 via stud 52 which is welded to rigid conduit 42. As can best be seen in FIG. 2, stud 52 is inserted through firmer 22 and spot welded to the exterior of rigid conduit 42. Although rigid conduit 42 is fastened to firmer 22 via bracket 50 and stud 52 in the exemplary embodiment, it is to be understood that conduit 42 may be fastened to firmer 22 by any means sufficiently strong to withstand the forces generated by firmer 22 being pulled through soil 30. Such forces often result from plant life, soil, or rocks which become caught between the conduit and firmer and tend to pry the conduit away from the firmer.

In operation, planter 20 is connected to a tractor (not shown) and driven through a field of soil 30. Seeds 28 are drawn from seed hopper 26, through chute 36, and deposited into furrow 34. Firmer 22 follows deposited seeds 28 and presses seeds 28 into soil 30 as best shown in FIG. 1. After seeds 28 are pressed into soil 30, liquid 38 is dispensed from supply tank 44. Liquid 38 is communicated from tank 44 to rigid conduit 42 via flexible hose 40. After liquid 38 is dispensed from rigid conduit 42 via outlet 48, discs 54 follow planter 20 to backfill furrow 34.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains, and which fall within the limits of the appended claims.

What is claimed is:

1. A seed planter comprising:
    a chute for depositing seeds in the ground, said chute being in communication with a supply of seeds,
    a firmer disposed adjacent said chute for embedding seeds into the ground, said firmer arranged to follow seeds deposited by said chute and press the deposited seeds into the ground; and
    a liquid dispenser disposed adjacent said firmer with a conduit attached to said firmer to communicate liquid from a liquid supply to the vicinity of the deposited seeds.

2. The planter of claim 1, wherein said conduit includes a rigid tube adapted to telescopingly receive a flexible hose, said flexible hose in communication with said liquid supply.

3. The planter of claim 2, wherein said rigid tube is manufactured from stainless steel.

4. The planter of claim 2, wherein said rigid tube is contoured and sized to be congruent with the contour of said firmer.

5. The planter of claim 1 wherein said conduit is attached to said firmer by at least one bracket.

6. The seed planter of claim 1, wherein said liquid dispenser is separate from and attached to said firmer.

7. The seed planter of claim 1, wherein said liquid dispenser includes a hose, said hose attached to said firmer by at least one clamp.

8. A seed embedding and liquid supply device comprising:
    an elastically deformable arm arranged to drag on the ground behind planted seeds, said arm having an end contacting said planted seeds and pressing said seeds into said ground; and
    a conduit attached to said deformable arm and having an inlet and an outlet, said inlet being in fluid communication with a supply of liquid, said outlet being arranged to deposit liquid in the vicinity of said arm end.

9. The seed embedding and liquid supply device of claim 8, wherein said conduit includes a rigid tube sized to telescopingly receive a flexible tube, said flexible tube in fluid communication with said supply of liquid, said rigid tube being attached to said deformable arm.

10. The seed embedding and liquid supply device of claim 8, wherein said conduit is attached to said deformable arm by at least one bracket.

11. The seed embedding and liquid supply device of claim 8, wherein said conduit is attached to said deformable arm by at least one metal stud, said metal stud protruding through said deformable arm and being welded to said conduit.

12. The seed embedding and liquid supply device of claim 8, wherein said conduit is contoured and sized to be congruent with the contour of said deformable arm.

13. A liquid dispensing device for use in connection with a seed firmer, the seed firmer being an elastically deformable arm attached to a seed planter, the seed firmer having an end dragging on the ground and embedding seeds after the seeds are deposited into the ground by the planter, said liquid dispensing device comprising:
    a conduit attached to the seed firmer and having an inlet and an outlet, said inlet being in fluid communication with a supply of liquid, said outlet being arranged to dispense said liquid in the vicinity of the firmer end; and
    means for attaching the conduit to said seed firmer.

14. The liquid dispensing device of claim 13, wherein said conduit includes a rigid tube, said rigid tube sized to telescopingly receive a flexible tube in fluid communication with said supply of liquid.

15. The liquid dispensing device of claim 14, wherein said rigid tube is manufactured from stainless steel.

16. The liquid dispensing device of claim 13, wherein said means for attaching includes at least one bracket.

17. The liquid dispensing device of claim 13, wherein said conduit is attached to said firmer by at least one metal stud, said metal stud protruding through said firmer and being welded to said conduit.

18. The liquid dispensing device of claim 13, wherein said conduit is contoured and sized to be congruent with the contour of the seed firmer.

* * * * *

UNITED STATES PATENT AND TRADEMARK OFFICE
CERTIFICATE OF CORRECTION

PATENT NO. : 5,730,074
DATED : March 24, 1998
INVENTOR(S) : Jeffrey Peter

It is certified that error appears in the above-identified patent and that said Letters Patent is hereby corrected as shown below:

Claim 1, Col. 4, Line 6 delete "timer" and insert --firmer--.

Signed and Sealed this

Twenty-eighth Day of July, 1998

Attest:

BRUCE LEHMAN

Attesting Officer

Commissioner of Patents and Trademarks